(12) United States Patent
Brown et al.

(10) Patent No.: US 10,081,305 B2
(45) Date of Patent: Sep. 25, 2018

(54) ACCESSORY MOUNTING SYSTEM FOR VEHICLE LOAD SPACE

(71) Applicant: JAGUAR LAND ROVER LIMITED, Whitley, Coventry, Warwickshire (GB)

(72) Inventors: Christopher Brown, Leamington Spa (GB); Christopher Bellamy, Suckley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 129 days.

(21) Appl. No.: 15/301,609

(22) PCT Filed: Mar. 26, 2015

(86) PCT No.: PCT/EP2015/056567
§ 371 (c)(1),
(2) Date: Oct. 3, 2016

(87) PCT Pub. No.: WO2015/150222
PCT Pub. Date: Oct. 8, 2015

(65) Prior Publication Data
US 2017/0021773 A1      Jan. 26, 2017

(30) Foreign Application Priority Data

Apr. 4, 2014    (GB) .................................. 1406057.8

(51) Int. Cl.
*B60R 11/00*      (2006.01)
*B60R 7/08*       (2006.01)
(Continued)

(52) U.S. Cl.
CPC ................. *B60R 7/08* (2013.01); *B60R 7/04* (2013.01); *B60R 11/00* (2013.01); *F16B 2/22* (2013.01);
(Continued)

(58) Field of Classification Search
CPC .. B60R 7/08; B60R 11/00; B60R 7/04; B60R 2011/0071; F16B 2/22
See application file for complete search history.

(56) References Cited

U.S. PATENT DOCUMENTS 3,599,918 A    8/1971  Patchett
5,573,217 A   11/1996  Garvey et al.
(Continued)

FOREIGN PATENT DOCUMENTS

DE    102004003991 A1    8/2004
FR        2437521 A1    4/1980
(Continued)

OTHER PUBLICATIONS

Combined Search and Examination Report for application No. GB1406057.8, dated Oct. 27, 2014, 6 pages.
(Continued)

*Primary Examiner* — Pinel E Romain
(74) *Attorney, Agent, or Firm* — Reising Ethington P.C.

(57) ABSTRACT

An accessory mounting system for a vehicle, comprising an accessory support including a first wall portion defining an outer support surface and an inner support surface; and a fastening device for fastening an accessory to the accessory support; wherein the fastening device includes a first structure and a clamping formation arranged to engage with the inner support surface so as to clamp the accessory support between the clamping formation and the first structure of the fastening device. A further aspect of the invention relates to an accessory for use in the system.

19 Claims, 8 Drawing Sheets

(51) Int. Cl.
    *B60R 7/04*    (2006.01)
    *F16B 2/22*    (2006.01)
    *F16B 2/20*    (2006.01)

(52) U.S. Cl.
    CPC ............ *B60R 2011/0036* (2013.01); *B60R 2011/0059* (2013.01); *B60R 2011/0071* (2013.01); *F16B 2/20* (2013.01)

(56) References Cited

U.S. PATENT DOCUMENTS

| | | | |
|---|---|---|---|
| 5,975,476 A | 11/1999 | Mancinelli | |
| 6,129,253 A * | 10/2000 | Brown | B60R 7/02 224/545 |
| 6,663,067 B2 * | 12/2003 | Gordon | A47G 25/065 224/553 |
| 7,837,248 B2 * | 11/2010 | Nedelman | B60R 7/10 224/313 |
| 9,783,117 B2 * | 10/2017 | Nieto | B60R 7/08 |
| 9,914,399 B2 * | 3/2018 | Lewis | B60R 7/08 |
| 2010/0012331 A1 * | 1/2010 | Larter | C09K 8/58 166/401 |
| 2011/0240815 A1 | 10/2011 | Chak | |
| 2014/0210226 A1 * | 7/2014 | Cobb | B60R 13/01 296/39.1 |
| 2015/0150389 A1 | 6/2015 | Nilsson | |
| 2017/0129412 A1 * | 5/2017 | Lewis | B60R 7/08 |

FOREIGN PATENT DOCUMENTS

| | | |
|---|---|---|
| FR | 2723620 A1 | 2/1996 |
| GB | 2034798 B | 6/1980 |
| GB | 2270057 A | 3/1994 |
| GB | 2336345 A | 10/1999 |
| JP | 2001012443 | 1/2001 |
| WO | WO2013191623 A1 | 12/2013 |

OTHER PUBLICATIONS

International Search Report for International application No. PCT/EP2015/056567, dated Jun. 16, 2015, 5 pages.
Written Opinion for International application No. PCT/EP2015/056567, dated Jun. 16, 2015, 6 pages.

* cited by examiner

ACCESSORY MOUNTING SYSTEM FOR VEHICLE LOAD SPACE

TECHNICAL FIELD

The invention relates to a mounting system with which an accessory can be removably mounted to a support by way of a fastening device and, in particular, to a support provided in a passenger cabin or load space of a vehicle. Aspects of the invention also include a fastening device for use in the mounting system, and a vehicle that incorporates the accessory mounting system.

BACKGROUND

Vehicle load spaces provide an area within a vehicle to store different forms of loads or cargo. The usability of such load spaces can be improved in various ways, for example by installing removable shelves to split the load space vertically or horizontally, by providing eyelets into which retaining clips of a cargo net can be engaged to stretch the cargo net across a portion of the load space, or by providing a variety of secure anchor points that are integrated into the interior walls or floor of the load space.

Figure 1:
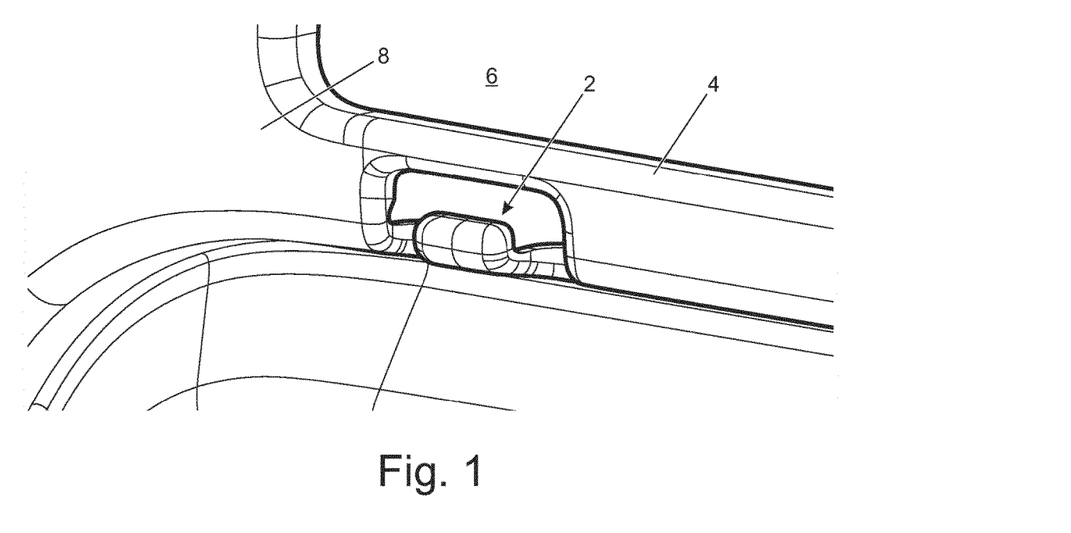
FIG. 1 is a prior art hook formation defined in a section of trim in a vehicle load space.

FIG. 1 illustrates an example of such a load space feature, in which a hook formation 2 is molded into a trim component in the form of a surround 4 of a storage recess 6, also referred to as a 'cubby', that is provided in the wall 8 of the vehicle load space, although the cubby 6 could also be provided in the passenger cabin of the vehicle. The hook formation 2 allows various items to be attached to it. For example, bag handles may be secured over the hook formation 2 or bungee cords may be secured to it in order to tie-down items of cargo that may be placed in the load space. However, the configuration of the hook formation 2 in FIG. 1 has limited usability, and it is against this background that the invention has been devised.

SUMMARY OF THE INVENTION

According to one aspect of the invention, the invention provides an accessory mounting system for a vehicle, comprising an accessory support including a first wall portion defining an outer support surface and an inner support surface; and a fastening device for fastening an accessory to the accessory support. The fastening device includes a first structure and a clamping formation arranged to engage with the inner support surface so as to clamp the accessory support between the clamping formation and the first structure of the fastening device.

The invention therefore provides a system by which an accessory incorporating the fastening device can be removably mounted to an accessory support quickly and easily by a user. The accessory which incorporates the fastening device may take on many forms, some example of which are a hook device for mounting bags, bungee cords and the like, holders for mobile devices and drinks cups, rubbish bins and pouches for clothing and other loose articles.

The clamping formation may include a resilient member which is positioned into a compressed condition when the fastening device is engaged with the accessory support. The resilience of the member permits it to deflect during engagement with the accessory support so it exerts a gripping force thereon.

The resilient member may include a cam feature to bear against the inner support surface. The cam feature may be located at or near to the mid-point of the resilient member. Preferably, the cam feature includes a profiled outer surface that defines a first contact region for bearing against the inner support surface of the accessory support in the region of the first wall portion and a second contact region for bearing against the inner support surface of the accessory support in the region of the second wall portion. The cam feature therefore serves to brace the fastening device against two wall portions of the accessory support which provides a robust engagement. The arrangement of the contact regions enables the device to define a snap-fit engagement so that it 'clicks' into its home position.

In order to provide a tactile 'click' when the fastening device locates in position, it is preferred that the first and second contact faces are substantially flat, and that a further flat surface or 'chamfer' extends obliquely between the first and second contact faces.

To provide flexibility in the configuration of the accessory support, the inner support surface of the first wall portion may include an extension feature that extends inwardly from the first wall portion towards the clamping formation and so provides a bearing part for the resilient member. The extension feature may extend along the length of the accessory support to allow engagement of the fastening device at a range of locations which provides the user with a great deal of flexibility over where the device is positioned. In one embodiment, the extension feature is generally in parallel with the second wall portion.

Beneficially, the accessory support may include means defining a plurality of discrete positions at which the fastening device can engage with the accessory support. The positioning means may be in the form of a plurality of partitions defining a plurality of indexed positions at which the fastening device can engage with the accessory support. This feature helps to guard against the device sliding on the accessory support in use.

Preferably the fastening device may include a portion that extends away from the accessory support, when engaged therewith, so as to provide a contact area to facilitate removal of the fastening device from the support.

The invention also resides in the fastening device for use in the accessory mounting system described above.

BRIEF DESCRIPTION OF THE DRAWINGS

One or more embodiments of the invention will now be described, by way of example only, with reference to the accompanying drawings, in which.

For the avoidance of doubt, throughout the description, terms such as 'upper', 'lower', 'horizontal', 'vertical' and so on relate to the orientation of the components of the accessory mounting system as shown in the accompanying drawings. It will be appreciated, however, that the mounting system may be used in any suitable orientation so the aforementioned terms are not to be interpreted as requiring a particular orientation.

DETAILED DESCRIPTION OF THE EMBODIMENTS

Figure 2:
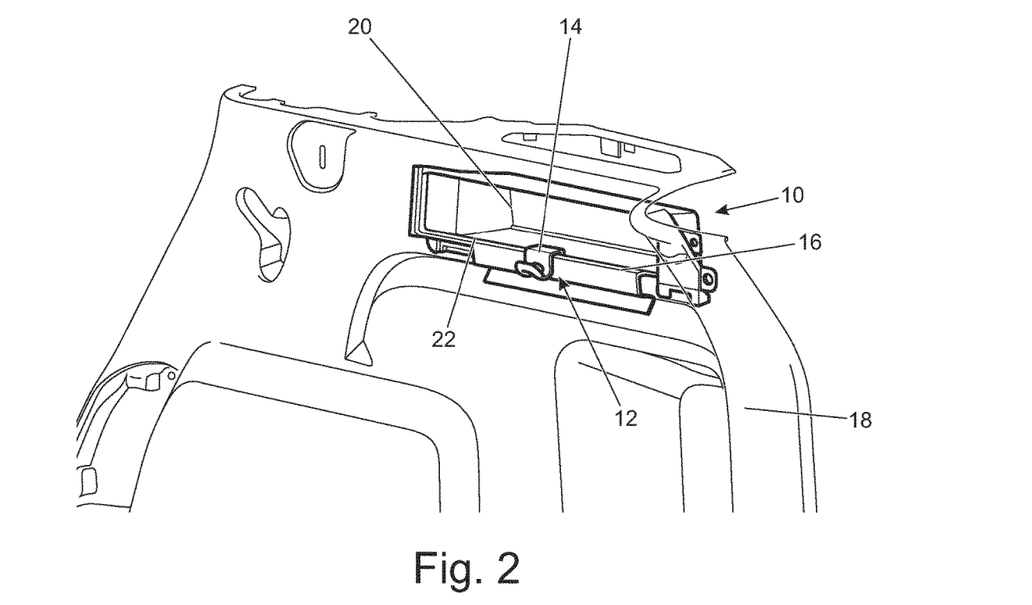
FIG. 2 is a perspective view of an accessory mounting system in situ within a section of trim that may define part of a vehicle load space.
Figure 3:
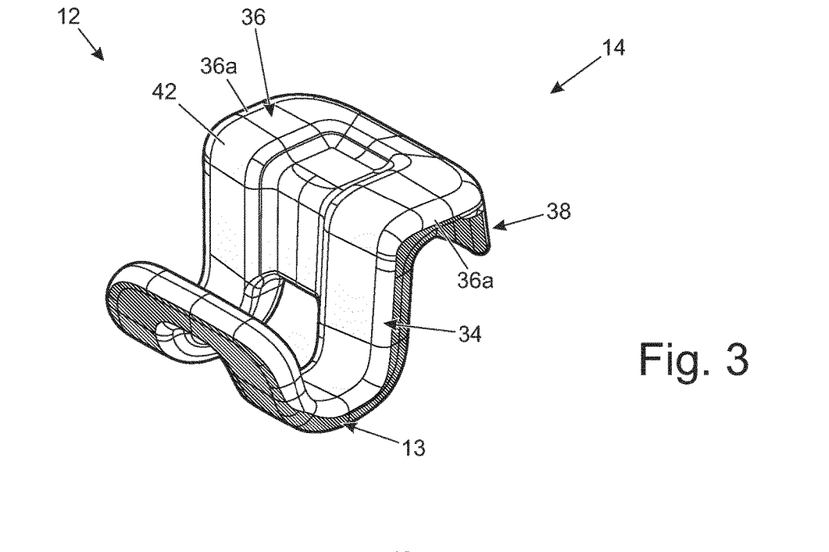
FIGS. 3 and 4 are perspective views from alternative angles of an accessory incorporating a fastening device of the mounting system and FIG. 5 is a side view of the accessory.
Figure 4:
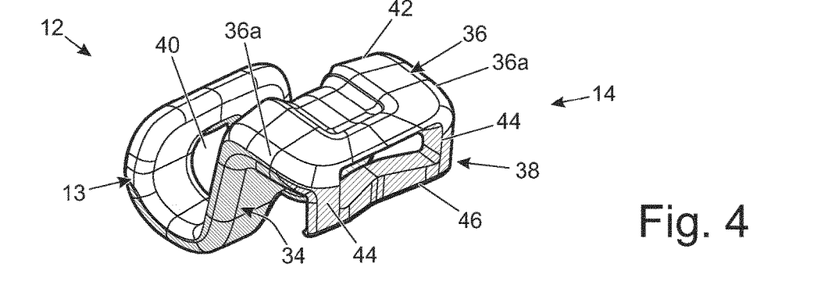

With reference to FIG. 2, an accessory mounting system 10 includes an accessory 12 incorporating a fastening device 14 which is attachable to an accessory support 16. In this case, the accessory support 16 includes a section of interior trim piece 18 defined in the vehicle load space, although the trim piece 18 could be anywhere in the interior cabin-space of the vehicle.

The trim piece 18 is shown here as defining a storage recess or 'cubby' 20 into which various items may be placed by the user of the vehicle, although other forms of trim pieces are also envisaged not necessarily defining a cubby space. The opening of the cubby 20 is defined by a frame-like surround 22, and the accessory support 16 is integrated into a portion of the surround 22.

The accessory support 16 is configured in the form of a linear rail 16 onto which the accessory 12 may be clipped and unclipped using the fastening device 14 at a variety of positions along the rail 16. As shown here, the accessory 12 includes a hook formation 13 onto which items may be hung and the fastening device 14 forms an integral part of the accessory 12 in that the hook formation 13 blends into the fastening device 14. For example, bag handles bags may be hung from the hook or other accessories may be configured to be mounted upon the hook, or between a pair of such hook formations located in opposed locations on opposite sides of the vehicle load space.

At this point it should be noted that although the accessory 12 is described here as including a hook, the fastening device 14 may be incorporated into other forms of accessories, such as a cup holder, rubbish bin, media pouch for printed media or electronic devices, stuff pouches for articles of clothing, cycle accessories such as pneumatic pumps and helmets, or a mobile phone holder to name a few non-limiting examples. Also, the fastening device 14 may be a separable component of the accessory, although it is shown as an integral part of the accessory in this embodiment.

Figure 5:
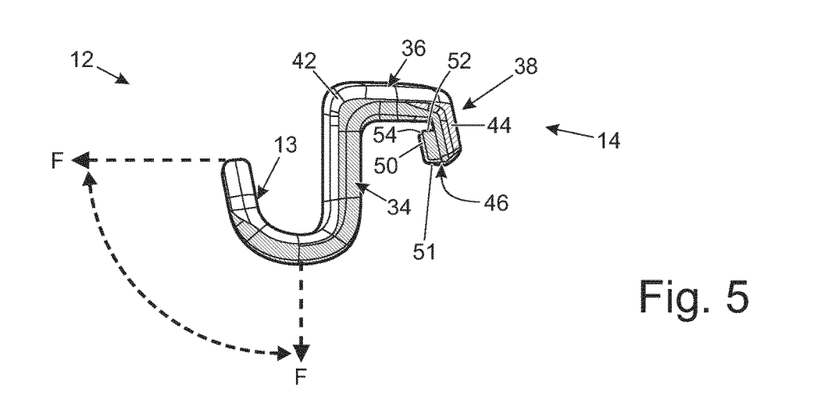

As mentioned above the fastening device 14 is releasably engageable with the rail 16 and, when in an engaged position, it is robust against forces applied to it in a wide range of directions, as illustrated by the arrows F shown in FIG. 5. Conveniently, the fastening device 14 can be attached to the rail 16 and then released from it easily by a user simply by moving the device 14 angularly with respect to the rail 16 as will be explained more fully later. Although not essential, measures are preferably provided to ensure that the fastening device 14 is unable to slide along the rail 16 when it is engaged with it, as will become apparent from the following description.

Figure 6A:
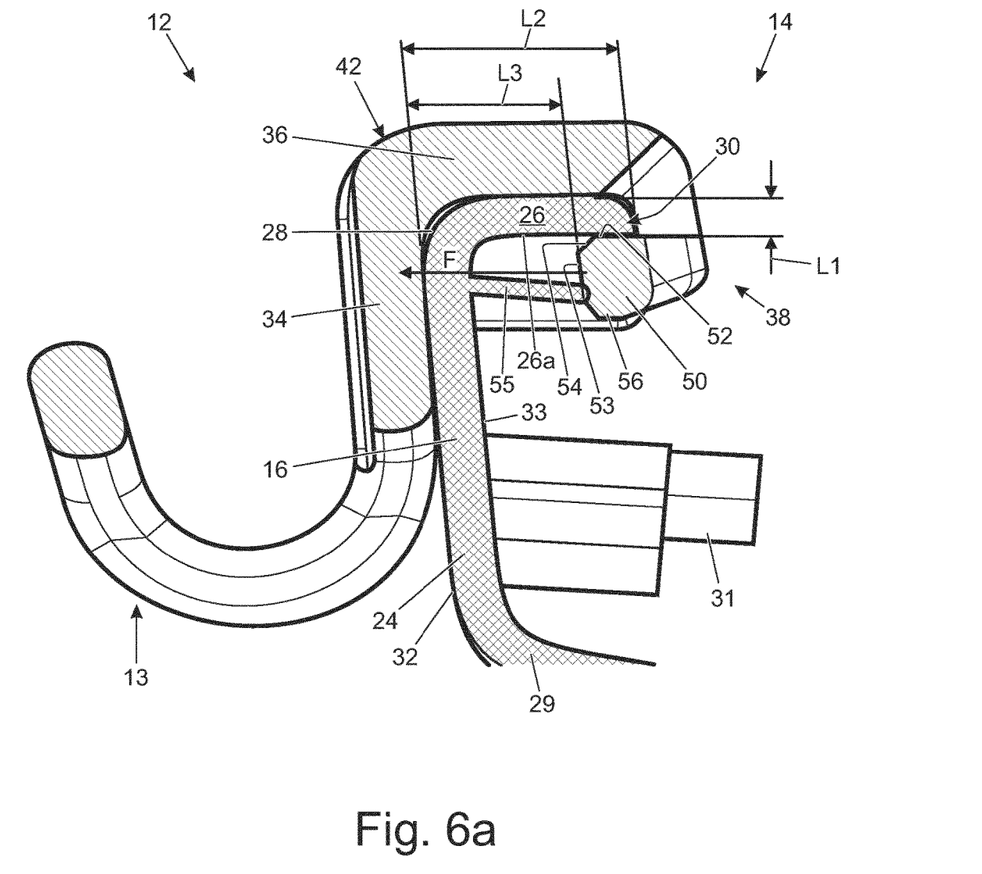
FIG. 6a is a section view taken along the centerline of the accessory in FIGS. 3 to 5 when it is engaged with an accessory support of the mounting system.

FIGS. 3 to 6a,b show the fastening device 14 in more detail. With reference firstly to FIG. 6a which is a cross section through the rail 16 taken through the centerline of the fastening device 14, the rail 16 includes a first, major, wall portion 24 and a second, minor, wall portion 26. The major wall portion 24 is substantially vertical in the orientation shown here, as the rail 16 would be mounted in the load space of the vehicle. However, it should be noted that the term 'vertical' is used here only in the context of the drawings and that it is not essential for the major wall portion 24 to be vertically oriented for the mounting system to function.

The minor wall portion 26 is adjacent to an upper part of the major wall portion 24 and extends, via a corner edge 28, transverse to the major wall portion 24 and, preferably, substantially at right angles so that it oriented horizontally as shown in the figures. Other configurations are possible. The rail 16 therefore takes the general form of an inverted 'L' shape in cross section. The corner edge 28 is radiused slightly to improve the tactility of the rail 16 during user interaction. The minor wall portion 26 terminates in an outer edge 30 that is also radiused to improve its tactility. Due to its profile, the rail 16 can be considered to have an outer support surface 32 which faces outwards and is visible to a user, and an inner support surface 33 defined by the posterior surfaces of the major and minor wall portions 24,26 and which is not ordinarily visible to a user.

Figure 8:
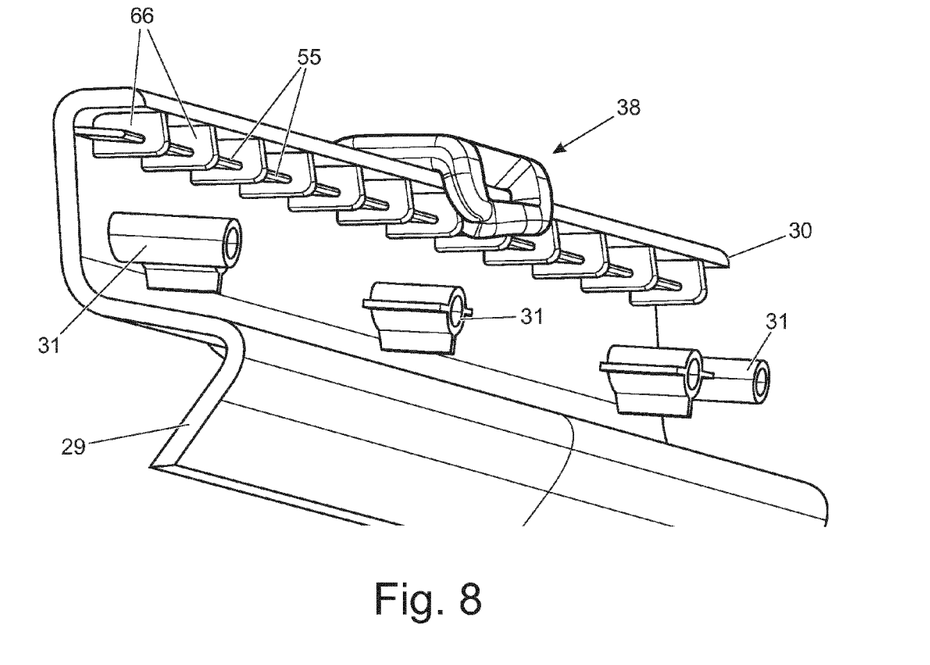
FIG. 8 is a perspective view from the rear of the mounting system in FIGS. 2 to 7 showing the accessory engaged with the accessory support.

At its lower end the major wall portion 24 recedes into a V-shaped groove 29, as shown partly in FIG. 6a, but viewed more fully in FIG. 8. The V-shaped groove 29 is a profiling feature designed to maximize load space volume and to accommodate the fingertips of a user when clipping and unclipping the accessory 12 to the rail 16, and is not essential to the inventive concept. Furthermore, bosses 31 are provided on the reverse side of the rail 16 by which the rail 16 may be mounted to a section of vehicle interior.

The fastening device 14 is configured to extend about and grip or clamp onto the major and minor wall portions 24,26 of the rail 16 and this is illustrated clearly in FIG. 6a. To this end, the fastening device 14 includes a includes a first, 'hanger', structure in the form of a first wall portion 34 from which the hook formation 13 extends, a second 'upper rest' structure in the form of a second wall portion 36, and a clamping formation 38. The fastening device 14 engages with the rail 16 in an angular or rotary movement so that the clamping formation 38 grips onto the inner support surface 33 of the rail 16 and holds the fastening device 14 securely to the rail 16. The hook formation 13 extends from a lower end of the first wall portion 34 and, in this particular embodiment, the hook formation 13 includes an opening 40 to allow items to be clipped to it, for example carabineers and bungee cord clips. In this embodiment, the first wall portion 34, the second wall portion 36, the hook formation 13 and the clamping formation 38 are formed from a single component. However, it should be appreciated that these features could be formed from separate attached or interconnecting parts.

In order to ensure that the fastening device 14 attaches onto the rail 16 in a snug fit, the first wall portion 34 and the second wall portion 36 of the fastening device 14 are transverse to one another so as to complement or conform to the profile of the rail 16. As a result, when the accessory 12 is clipped onto the rail 16, the first wall portion 34 of the fastening device 14 lies adjacent the major wall portion 24 of the rail 16, and the second wall portion 36 lies adjacent to the minor wall portion 26. The first and second wall portions 34, 36 of the fastening device 14 define a corner edge 42 between them, the internal elbow of which is radiused generally to complement the corner edge 28 of the rail 16.

The clamping formation 38 extends from the rear of the second wall portion 36 of the fastening device 14 and provides a means by which the fastening device 14 may clamp or grip the rail 14, as will now be described in more detail.

The clamping formation 38 comprises first and second posts or legs 44 which depend downwardly from respective short sides 36a of the second wall portion 36. A resilient structure 46 is provided in the form of a bow-like member that extends between, and so is joined to, the first and second legs 44. The resilient member 46 is curved along its length so that it extends underneath the second wall portion 36 and, when the fastening device 14 is attached to the rail 16, the resilient member 46 extends underneath the minor wall portion 26 of the rail 16 so as to abut against it. Here the resilient member 46 is curved to define a bow-like shape so that it projects furthest under the outer edge 30 at its mid-position. Other forms are possible, for example the resilient member 46 may be substantially straight between the first and second leg members but include a projection at its midpoint that extends underneath the outer edge 30. In this embodiment, it can be seen that the resilient member 46 defines a cam feature or 'lobe' 50 about which the fastening device 14 pivots as it is engaged with the rail 16. The cam feature 50 includes a curved underside 56, an upper contact face or region 52, a front contact face or region 53 and an oblique chamfer 54 extending between them which provides the fastening device with a tactile 'snap' as it is moved into an engaged position on the rail 16, as will be explained. Note that the cross sectional profile of the cam feature 50 is shown most clearly in FIG. 6a.

The angle of the chamfer is selected based on factors such as the material of the fastening device 14 and the force considered necessary to engage the fastening device 14 onto the rail. In the embodiment shown, the angle that the chamfer 54 defines with the upper contact face 52 is approximately 35 degrees, although this is not to be considered limiting.

When in the engaged position, as is shown in FIG. 6a, the resilient member 46, and more specifically the cam feature 50, is in contact with, and is put under compression by, an extension feature 55 which, in this embodiment, is in the form of a bracing rib that extends from the major wall portion 24 along the length of rail 16 generally parallel to, but slightly divergent from, the minor wall portion 26. The bracing rib 55 thereby functions as an extension of the inner support surface 33 of the rail 16 against which the clamping formation 38 engages to clamp the rail 16 between it and the first wall portion 34 of the fastening device 14.

The loading of the resilient member 46 into a compressed condition establishes a clamping force, shown as 'F' on FIG. 6a, which is generally perpendicular to the first wall portion 34 and which ensures that the fastening device is held securely on the rail 16. In effect, the resilient member 46 acts to pull the first wall portion 34 inwards in a direction perpendicular to the major wall portion 24 of the rail 16. It would also be acceptable for the fastening device to be configured such that the resilient member 46 pulls the first wall portion 34 towards it at a downwards angle.

Figure 6B:
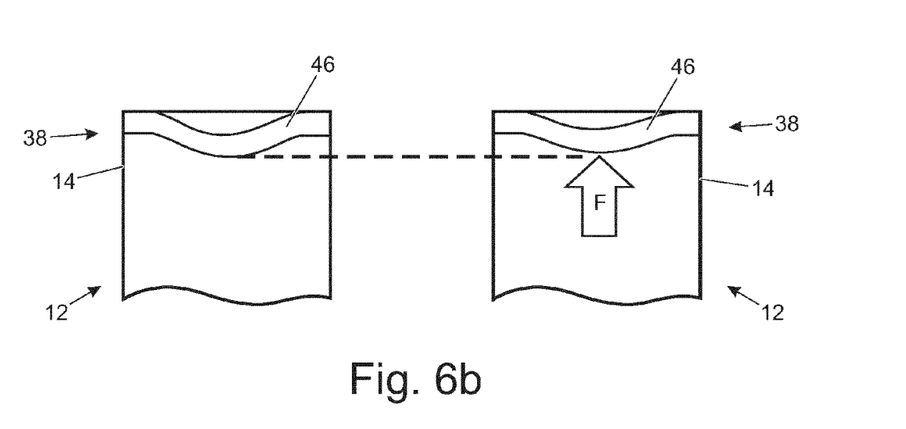
FIG. 6b is a schematic view of the accessory from underneath illustrating deflection of a resilient member thereof.

The deflection of the resilient member is illustrated schematically in FIG. 6b, which shows the underside of the accessory 12. On the left of the Figure the resilient member 46 of the clamping formation 38 is shown in its unloaded condition as would be the case where the accessory 12 is not attached to the rail 16. On the right hand side of the Figure, the accessory 12 is shown in what can be considered to be a mounted position, although the rail is not shown here for clarity. Instead, the effect of the rail is shown by arrow F and the resilient member 46 is shown to have deflected rearwards so that the central, curved, section of the resilient member 46 is put into compression between the first and second legs 44. The reaction force to the loading of the resilient member 46 by the rail 16 provides the clamping force, as shown on FIG. 6a, against the surface 33 of the upright portion 24 of the rail 16.

At this point it should be mentioned that the dimension L1 defined between the underside of the second wall portion 36 and the contact face 52 of the resilient member 46 is substantially equal to the thickness of the minor wall portion 26 of the rail 16 which ensures that the clamping formation 38 is able to clamp onto the rail 16. Also, the dimension L2 defined between the first wall portion 34 and the clamping formation 38 is substantially equal to the distance between the outer surface 32 of the major wall portion 24 and the outer edge 30 of the rail 16. Finally, the dimension L3 from the outer surface of the major wall portion 24 and the end of the bracing rib 55 is slightly smaller than the distance between the cam feature 50 and the first wall portion 34 of the fastening device 14, when the fastening device is not fastened to the rail 16, so as to establish the clamping force between the cam feature 50 and the first wall portion 34.

The sequence through which the fastening device 14 is moved angularly to clamp onto the rail will now be described with reference to FIGS. 7a to 7e.

Figures 7A, 7B, 7C, 7D, 7E:
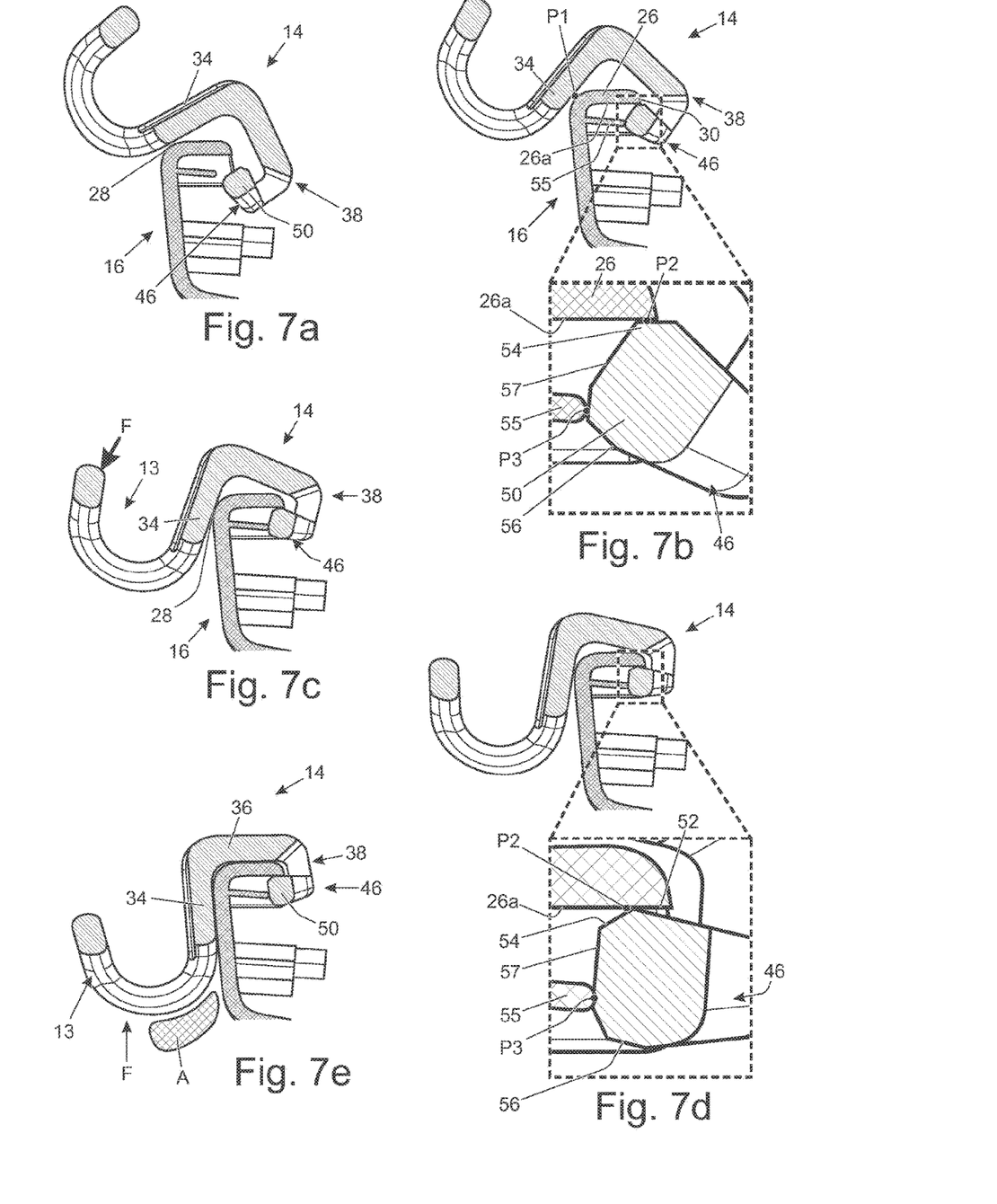
FIGS. 7a to 7e together provide a sequence of section views which show the accessory being engaged with the accessory support.

FIGS. 7a and 7b illustrate the fastening device 14 being moved to an initial position with respect to the rail 16. In FIG. 7a the fastening device 14 is tilted backwards with respect to the rail 16 so that the clamping formation 38 extends to the rear of and below the outer edge 30 of the rail 16 and, in this position, the first wall portion 34 of the fastening device 14 rests on the front corner edge 28 of the rail 16. In FIG. 7b, the resilient member 46 is brought into contact with the underside 26a of the minor wall portion 26 near to the outer edge 30, and it also abuts up against the bracing rib 55, which is shown more clearly in the enlarged inset view. In this position, the fastening device 14 is in contact with the rail 16 at three regions or points: a first contact point P1 is defined between the corner edge 28 of the rail 16 and the first wall portion 34 of the fastening device 14, a second contact point P2 is defined between the oblique chamfer 54 of the cam feature 50 of the resilient member 46 and the underside 26a of the minor wall portion 26 and a third contact point P3 is defined at where the cam feature 50 meets the bracing rib 55. It should be noted that the resilient member 46 therefore bears against the inside surface of the rail 16 at two contact regions (P2 on the underside 26 of the minor wall portion 26 and P3 on the bracing rib 55) as the fastening device 14 is secured in position, as is described below, and in doing so provides a resistance to angular movement of the fastening device 14.

In FIG. 7c, the fastening device 14 is being moved angularly in an anti-clockwise direction with respect to the rail 16, as can be achieved through the application of a force F applied to the hook formation 13. Due to the oblique chamfer 54 on the cam feature 50 and the contact between the cam feature 50 and the bracing rib 55, the cam feature acts in the manner of a cam and initially resists being moved angularly. However, on application of a sufficient force the resilient member 46 deflects elastically by a small amount which allows the fastening device 14 to rotate about the resilient member 46 whilst the first wall portion 34 of the fastening device 14 slides relative to the corner edge 28.

In the position shown in FIG. 7d, the fastening device 14 has almost fully rotated about the resilient member 46 into its engaged or 'home' position. As the device rotates, the contact region P2 between the cam feature 50 and the underside 26a of the minor wall portion 26 transitions between the oblique chamfer 54 towards the upper contact face 52 of the cam feature 52 and the bracing rib 55 slides along the curved underside 51 of the cam feature 50 towards the flat front face 53 of the cam feature 50. As this transition occurs, the fastening device 14 no longer opposes anticlockwise angular movement and so it 'snaps' in the engaged position that is shown in FIG. 7e, in which the clamping formation engages with the inner support surface 33 of the rail 16 so that it is clamped between it and the first structure (wall portion 34) of the fastening device 14. The 'snap location' helps the user to gauge when the fastening device 14 is in a 'home' position purely by feel, which may be helpful in circumstances when visibility is poor, for example in low light conditions or if obscured by other items in the load space. Alternatively, a radiused profile may be provided instead of the chamfer 54 which would not affect the ability of the fastening device 14 to engage with the rail 16, although the snap-location effect would not be achieved.

As has been mentioned, the bracing rib 55 serve as a bearing point for the resilient member 46 such that, as the cam feature 50 moves angularly the bracing rib 55 puts the resilient member 46 into a compressed condition. The rail 16 is therefore clamped between the front face 53 of the cam feature 50 and the front wall portion 34 of the fastening device 14.

The fastening device 14 may be removed from the rail 16 simply by reversing the steps described above through the application of a force shown by arrow F in FIG. 7e; typically this will be achieved by a user using their finger to lever the device 14 off of the rail 16. Conveniently, it will be appreciated here that the shape of the device 14 means that a portion of it extends away from the rail 16 and provides a comparatively large zone (indicated by hatched area 'A') in which the user may place their finger underneath the device 14 to facilitate its removal. Note that although this feature is provided by a combination of the hook formation 13 and the fastening device 14, it will be appreciated that the same advantageous feature could be provided by just the fastening device 14, suitably configured, in embodiments where it is incorporated into a form of accessory which isn't a hook.

The fastening device 14 may be made from any suitable material, although it is currently envisaged that it will be injection molded from a suitable plastics material such as a polycarbonate acrylonitrile butadiene styrene blend (PC-ABS), polypropylene (PP), or polyamide acrylonitrile butadiene styrene blend (PA-ABS). Similarly, the rail 16 may be formed from any suitable material, such as pressed steel or aluminum, but it is currently envisaged that it will be formed from molded plastics such as PC-ABS or PP.

The configuration of the fastening device 14 described above enables it to grip onto the rail 16 securely so that it resists being moved linearly along the rail 16. However, in order to eliminate the risk of the fastening device 14 slipping along the rail 16, the length of the rail is delimited by a series of partition walls 60 that are a molded feature of the rail 16. As can be seen in FIG. 8, the resilient member 46 is able to extend underneath the outer edge 30 of the rail at positions between adjacent pairs of the partition walls 60. Adjacent pairs of the partition walls 60 therefore define discrete locations at which the fastening device 14 may be attached to the rail 16—the curved shape of the resilient member allows easy self-location between adjacent pairs of walls 60. Other configurations are possible; partitions may be formed by providing the edge 30 of the minor wall portion 26 with an irregular profile along its length, for example a serrated or an undulating profile, or the major wall portion 24 may be provided with a suitable formation on its surface such as corrugations or notches. Selection of the dimension L3 between the cam feature 50 and the first wall portion 34 to be a less tight fit would enable the fastening device to be slid along the rail in an indexed manner for easy adjustment by the user.

Some variations on the specific embodiment shown in FIGS. 2 to 7 have already been described above. Further variations for the accessory mounting system will now be described.

Figure 9:
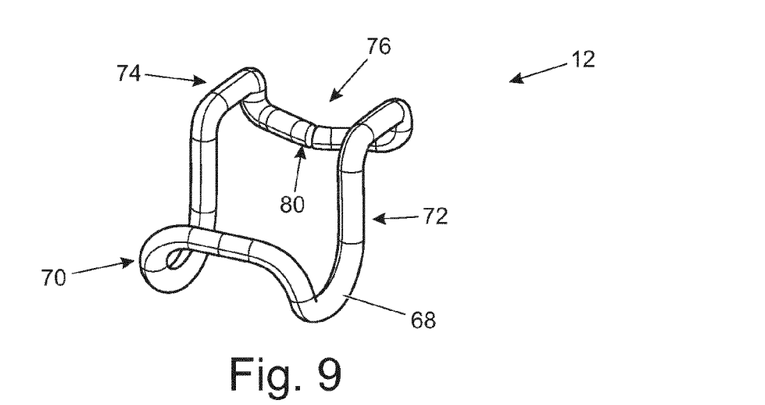
FIGS. 9 to 11 are views of an accessory and an accessory support of an alternative configuration of mounting system.
Figure 10:
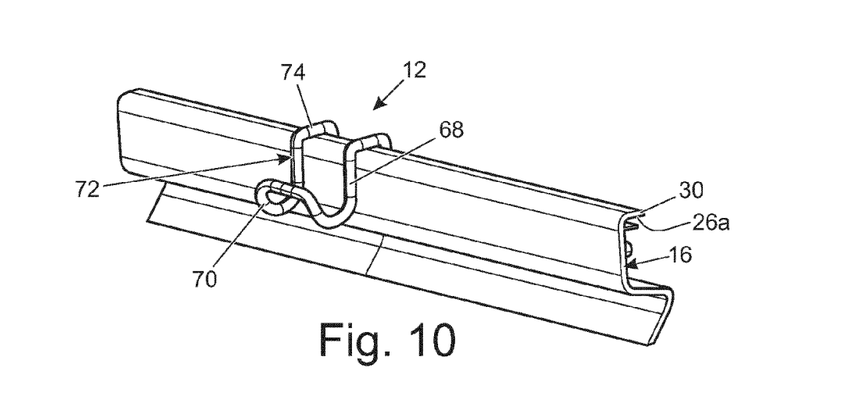
Figure 11:
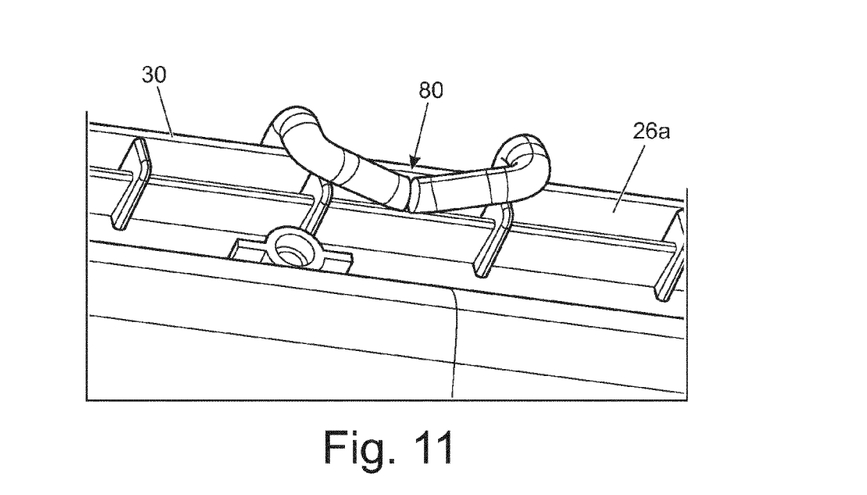

Firstly, FIGS. 9, 10 and 11 show an alternative accessory mounting system that includes a rail 16 identical to that described above, and an accessory 12 that is a shaped metal wire component. As can be seen in FIGS. 9 to 11 the overall shape of the accessory 12 is very similar to the accessory in FIGS. 2 to 8 and it performs the same function of clamping onto the rail 16.

Briefly, the accessory 12 include a single length of metal wire or rod 68 that is bent to define a hook formation 70 a hanger structure 72, an upper rest structure 74 and a clamping formation 76. A suitable thickness for the rod is 5 mm, although this is not to be considered limiting.

It should be noted that the hanger structure 72 is equivalent to the first wall portion 34 of the previous embodiment and that upper rest structure 74 is equivalent to the second wall portion 36. Therefore, when the fastening device is engaged with the rail, as shown in FIGS. 10 and 11, the hanger structure 72 lies adjacent the major wall portion of the rail 16, the upper rest portion 74 lies adjacent the minor wall portion 26 of the rail 16, and the clamping formation 76 extends over the outer edge 30 of the minor wall portion 26 so as to grip onto the inner support surface 33, 26a.

The hanger structure 72 comprises parallel sections of the rod 68 which extend from the hook formation 70 in an upwards direction and then curve through a right angle to form parallel arms of the upper rest structure 74. From there the parallel arms curve downwards to define the clamping formation 76. As in the previous embodiment, the clamping formation 76 is shaped so as to extend underneath the rail 16 and, to this end, the rod sections are angled inwardly so as to converge at an apex point 80. It is to be noted that in this embodiment the rod ends do not meet at the apex point but that a gap is formed between then and this provides a degree of resilience to the clamping formation 76 to enable the fastening device to be pivoted over the rail 16 in the manner of the previous embodiment. However, in variants of this embodiment the rod sections may be configured to meet so as to form a continuous rod, or the split between the rod sections may be offset instead of in a central position as in the present embodiment.

Figure 12:
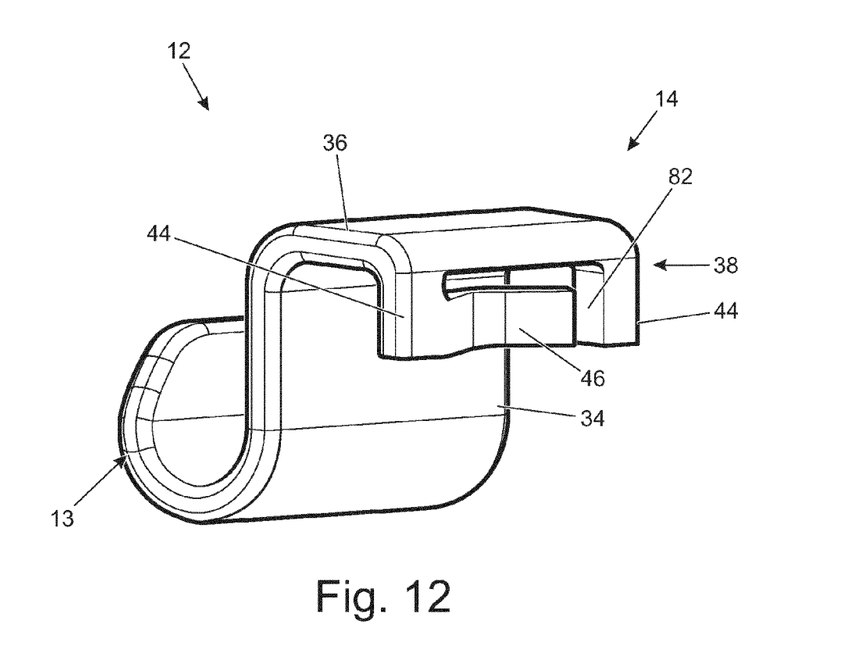
FIG. 12 is a perspective view from the rear of an accessory of an alternative configuration of mounting system and FIG. 13 is a view from underneath of the same accessory.
Figure 13:
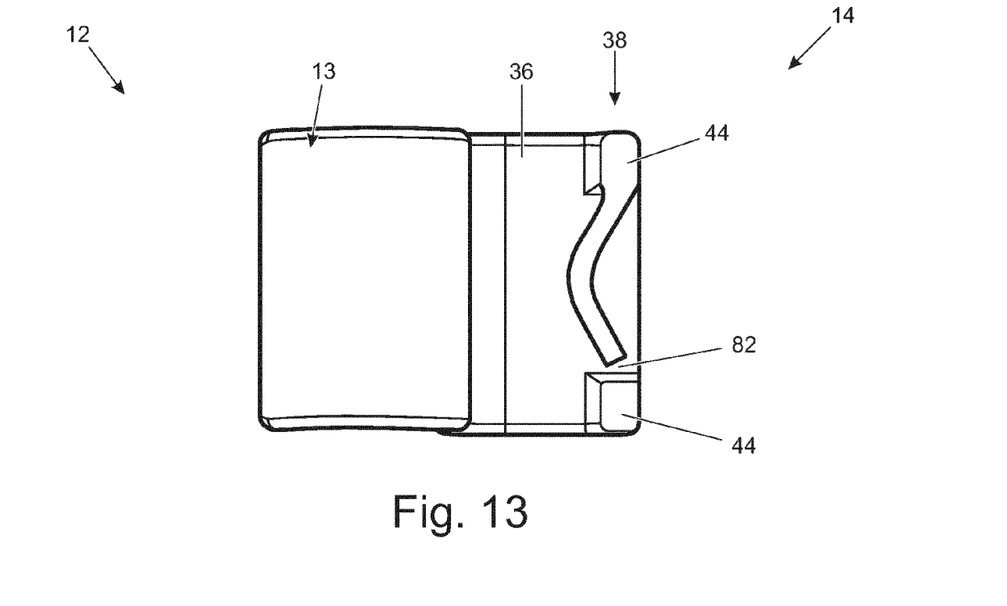

A further alternative configuration is shown in FIGS. 12 and 13. This embodiment is similar to the embodiment described above with reference to FIGS. 2 to 8 and so the same reference numerals will be used to describe the same features where appropriate for clarity. Common to the previous embodiment, the fastening device 14 includes a hook formation 13, a hanger structure defined by a first wall portion 34, an upper rest structure 36 defined by a second wall portion 26 substantially perpendicular to the first wall portion 34, and a clamping formation 38 that extends from the second wall portion 36.

In this embodiment, however, the clamping formation 38 has a different configuration, in that the resilient member 46 does not bridge the entire distance between the first and second legs 44. Instead, the pivot member 46 stops short of one of the legs 44 to define a gap 82, although the resilient member 46 still has the curved profile which pre-loads the pivot member 46 against the bracing member 55 of the rail 16 to ensure that the fastening device 14 grips onto the rail 16.

The mounting system has been described here in the context of a vehicle load space and, indeed, it is envisaged that the mounting system will be particularly useful in a vehicle load space. However, the mounting system may also be used in a different location within a vehicle such as integrated into an instrument panel, door card or side pillar, or in a different context, for example in a home, office space or aircraft cabin space to name a few examples.

In the above embodiments, the hanger structure 34 and the top rest structure 36 have been described as being perpendicular to one another. However, it will be appreciated that precise perpendicularity is not essential.

Further embodiments are shown in FIGS. 14a, 14b, 15a and 15b, in which components equivalent to those in the embodiments described above are referred to with the same reference numerals.

Figure 14A:
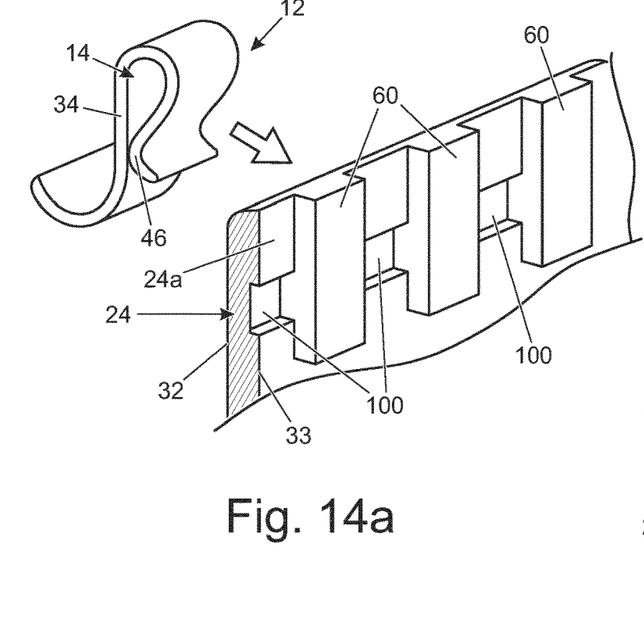
FIGS. 14a, 14b, 15a and 15b are views of alternative embodiments of an accessory mounting system.
Figure 14B:
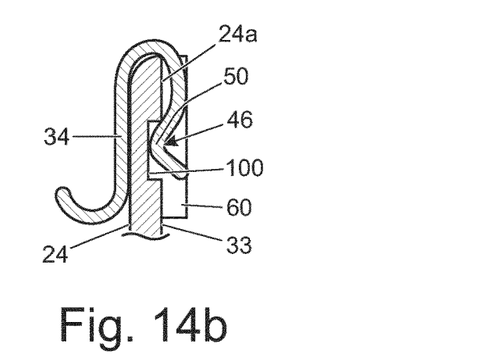

Firstly, with reference to FIGS. 14a and 14b, it will be noted that the accessory support 16 in this embodiment does not have an 'L' shaped cross section profile as in the previous embodiment. Instead, the accessory support 16 simply includes the major wall portion 24. The length of the accessory support 16 is provided by a plurality of partition walls 60 between pair of which the accessory incorporating the fastening device 14 can be mounted. The accessory 12 is shown separated from the accessory support 16 in FIG. 14a, but is shown in the mounted position in FIG. 14b.

A recess 100 is defined in the inner support surface 33 of the accessory support 16 and extends along it in a longitudinal direction between the partition walls 60. The resilient member 46 of the fastening device 14 engages into the recess 100 when it is placed into the 'home' position on the accessory support 16. The looped profile of the fastening device 14 enables the resilient member 46 to accommodate the wall thickness of the accessory support 16 whilst the resilient member 46 clicks into place within the recess 100 thus clamping the accessory support between the front wall portion 34 of the fastening device 14 and the resilient member in the same manner as the previous embodiments. It should be noted that the resilient member 46 protrudes into the recess 100 such that the upper section 24a of the wall overhangs the resilient member 46 and such that the cam feature 50 of the resilient member 46 engages the floor of the recess.

Figure 15A:
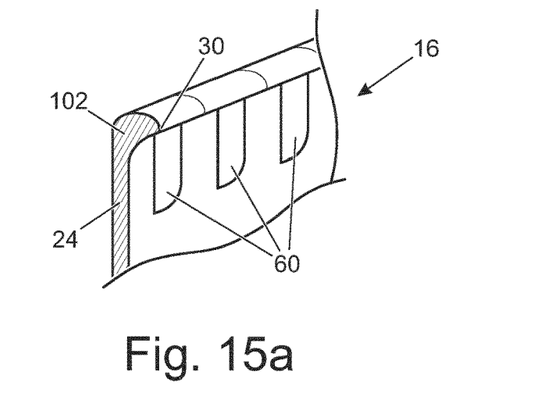
Figure 15B:
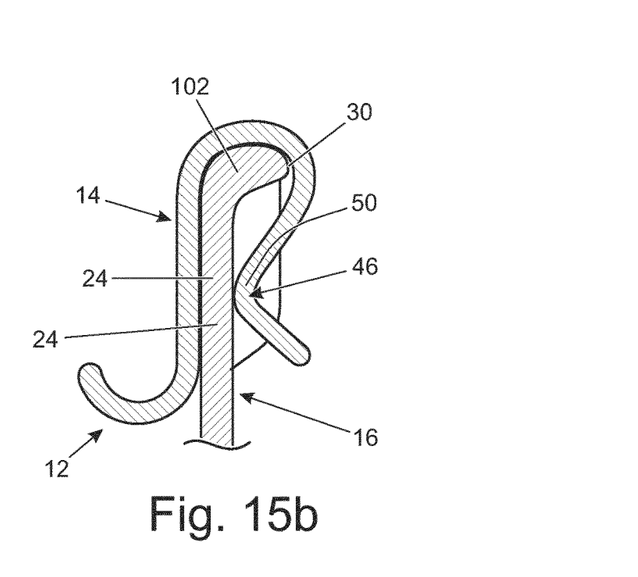

Turning to the embodiment of FIGS. 15a and 15b, it will be noted that the accessory support 16 is similar to that in FIGS. 14a and 14b, but includes a slightly curved top section 102 at the upper part of the first wall portion 24 that terminates in an outer edge 30. FIG. 15b shows the accessory 12 mounted on the accessory support 16 such that the accessory is located between a pair of the partitions 60. It can be seen that the outer edge 30 of the accessory support overhangs the resilient member 46 and the resilient member 46, and more specifically the cam feature 50, grips the accessory support 16 between it and the first wall portion 34 of the fastening device 14.

The invention claimed is:

1. An accessory mounting system for a vehicle, comprising:
   an accessory support including a first wall portion defining an outer support surface and an inner support surface; and
   a fastening device for fastening an accessory to the accessory support;
comprising:
   a first structure and a clamping formation arranged to engage with the inner support surface so as to clamp the accessory support between the clamping formation and the first structure of the fastening device, the clamping formation comprising a resilient member;
   wherein the resilient member is placed into a compressed condition when the fastening device is engaged with the accessory support; and
   wherein the resilient member includes a cam feature having a profiled outer surface that defines a first contact region for bearing against the inner support surface of the accessory support in the region of the first wall portion and a second contact region for bearing against the inner support surface of the accessory support in the region of a second wall portion and a further surface extending obliquely between the first and second contact regions, wherein, during use, the fastening device is configured to pivot about the cam feature so that the fastening device engages onto the accessory support, during which movement of the cam feature transitions from the oblique further surface being in contact with the inner support surface of the accessory support, to the second contact region being in contact with the inner support surface about a transition edge so that the fastening device snaps into engagement with the accessory support.

2. The mounting system of claim 1, wherein the first contact region is flat.

3. The mounting system of claim 1, wherein the second contact region is flat.

4. The mounting system of claim 1, wherein the inner support surface of the first wall portion includes an extension feature that extends inwardly from the first wall portion towards the clamping formation so that the clamping portion engages with the extension feature when clamping the accessory support between the clamping formation and the first structure of the fastening device.

5. The mounting system of claim 4, wherein the extension feature extends along the length of the accessory support.

6. The mounting system of claim 1, wherein the accessory support includes means defining a plurality of discrete positions at which the fastening device can engage with the accessory support.

7. The mounting system of claim 6, wherein the means includes a plurality of partitions and wherein the clamping formation is arranged to engage the accessory support between an adjacent pair of the plurality of partitions.

8. The mounting system of claim 1, including an accessory, and wherein the accessory defines a hook formation from which items may be hung.

9. The mounting system of claim 1, wherein the accessory support is incorporated into an interior trim piece of a vehicle.

10. A vehicle incorporating the mounting system of claim 1.

11. A fastening device for use in the accessory mounting system of claim 9, comprising a first structure and a clamping formation that is opposed to and extends towards the first structure.

12. The fastening device of claim 11, wherein the clamping formation includes a resilient member that extends towards the first structure.

13. The fastening device of claim 11, wherein the resilient member is curved along its length.

14. The fastening device of claim 5, wherein the resilient member includes a cam feature.

15. The fastening device of claim 14, wherein the cam feature is defined between the ends of the resilient member.

16. The fastening device of claim 15, wherein the cam feature includes a profiled outer surface that defines a first contact region for bearing against an inner support surface of the accessory support in the region of a first wall portion and a second contact region for bearing against the inner support surface of the accessory support in the region of a second wall portion.

17. The fastening device of claim 16, wherein the first contact region is flat.

18. The fastening device of claim claim 16, wherein the second contact region is flat.

19. The fastening device of claim 18, wherein the cam surface includes a further surface extending obliquely between the first and second contact faces.

\* \* \* \* \*